K. FUJITA AND G. N. MARKLE.
BURGLAR CHASER.
APPLICATION FILED APR. 24, 1918.

1,330,698.

Patented Feb. 10, 1920.
2 SHEETS—SHEET 1.

Inventors
Kuwakichi Fujita and
Gertrude N. Markle

Victor J. Evans
ATTORNEY

K. FUJITA AND G. N. MARKLE.
BURGLAR CHASER.
APPLICATION FILED APR. 24, 1918.

1,330,698.

Patented Feb. 10, 1920.
2 SHEETS—SHEET 2.

Inventors
Kuwakichi Fujita and
Gertrude N. Markle

Victor J. Evans
ATTORNEY

UNITED STATES PATENT OFFICE.

KUWAKICHI FUJITA AND GERTRUDE N. MARKLE, OF HAZLETON, PENNSYLVANIA.

BURGLAR-CHASER.

1,330,698. Specification of Letters Patent. Patented Feb. 10, 1920.

Application filed April 24, 1918. Serial No. 230,539.

*To all whom it may concern:*

Be it known that we, KUWAKICHI FUJITA and GERTRUDE N. MARKLE, a subject of the Emperor of Japan and a citizen of the United States, respectively, residing at Hazleton, respectively, in the county of Luzerne, respectively, and State of Pennsylvania, respectively, have invented new and useful Improvements in Burglar-Chasers, of which the following is a specification.

This invention relates to the general class of protective systems for dwelling houses or other buildings and contemplates for its principal object the provision of a series of alarm boxes distributed throughout the various rooms of the building which are operable from a common central station, provided with a selective mechanism whereby any one of the several alarm boxes may be operated to frighten off burglars or other intruders.

Another object of the invention is the provision of a protective system including safety alarm boxes which are pivoted in casings, said boxes containing a series of cartridge containing barrels and means for firing the same successively, said boxes being normally disposed in a position to present the muzzle of said barrels toward the wall of the room and adapted to be swung upon its pivot to dispose the muzzles toward the interior of the room.

A still further object of the invention is the provision of a protective system having alarm mechanisms normally inactive and means for selectively rendering the same active pneumatically whereby the operator may select any one of the alarm mechanisms in the system.

A further object of the invention is the provision of a system of the class described which is simple in construction, inexpensive to manufacture and which may be readily installed within a building.

With these and other objects in view, the invention resides in the novel construction, combination and arrangement of parts fully described and pointed out in the following description and claims and illustrated in the accompanying drawings, in which:—

Figure 1:
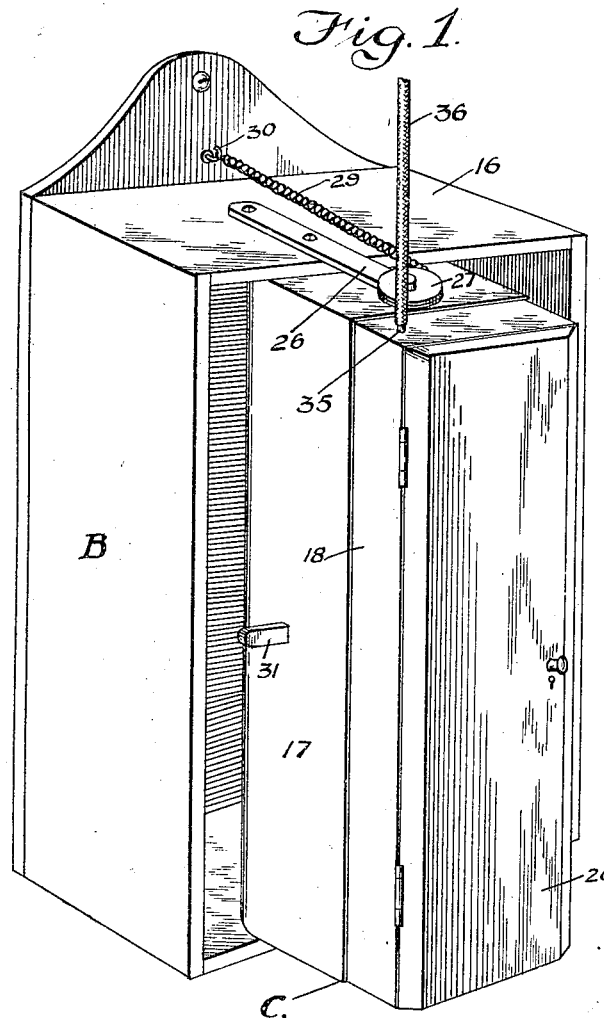
Figure 1 is a perspective view of one of the alarm boxes and the casing containing the same.
Figure 2:
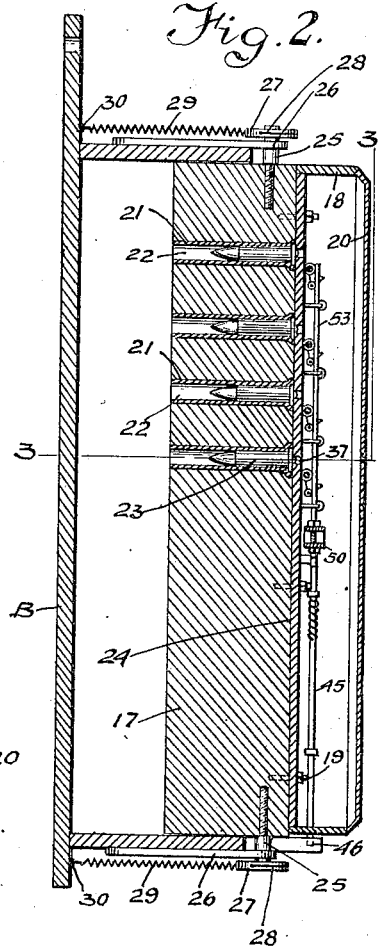
Fig. 2 is a vertical sectional view therethrough.
Figure 3:
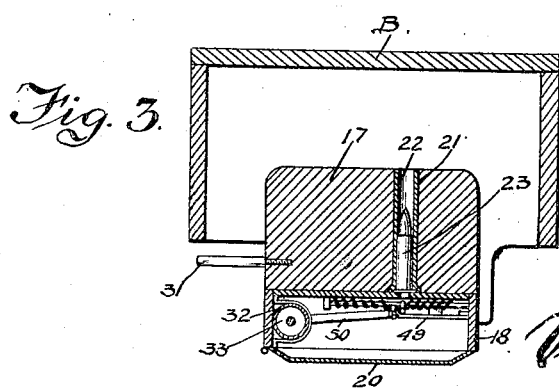
Fig. 3 is a horizontal section on the line 3—3 of Fig. 2.
Figure 4:
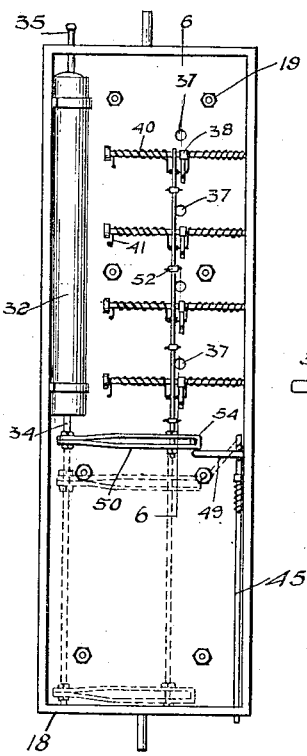
Fig. 4 is a front elevation of the alarm box removed from the casing with the cover removed.
Figure 5:
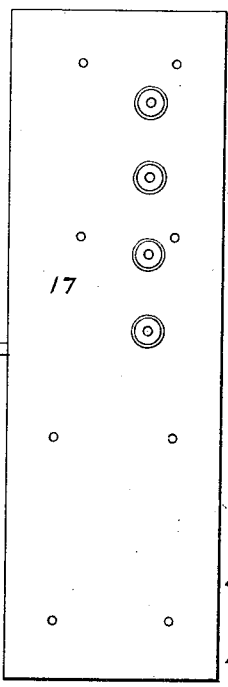
Fig. 5 is a front elevation of the block with the housing removed therefrom.
Figure 6:
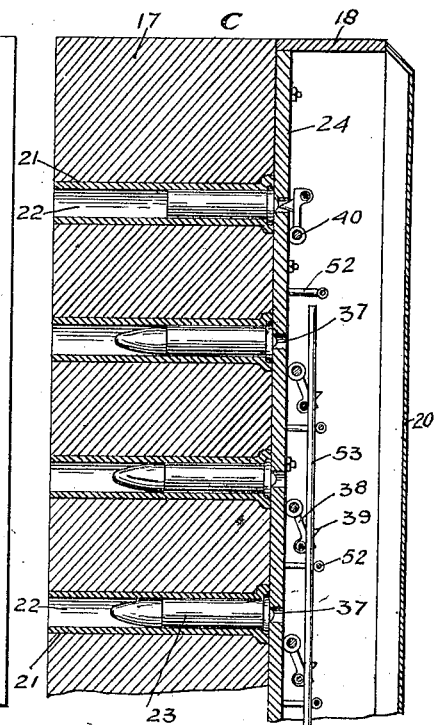
Fig. 6 is an enlarged vertical sectional view on the line 6—6 of Fig. 4.
Figure 7:
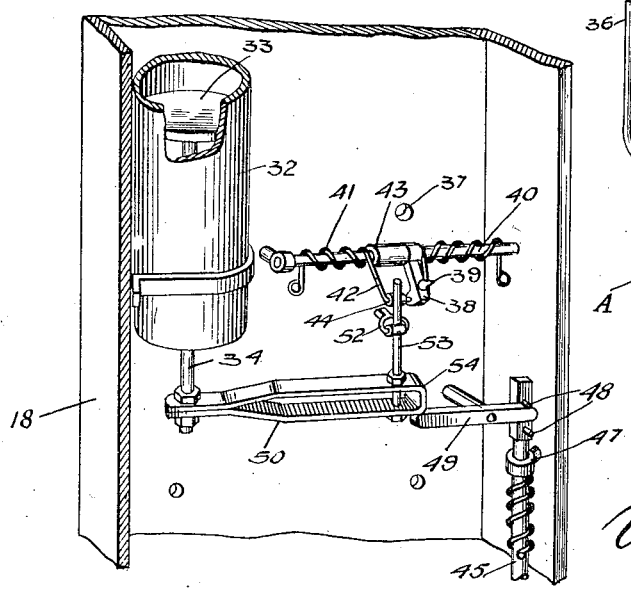
Fig. 7 is an enlarged fragmentary perspective view of the housing with the operating mechanism shown therein.
Figure 8:
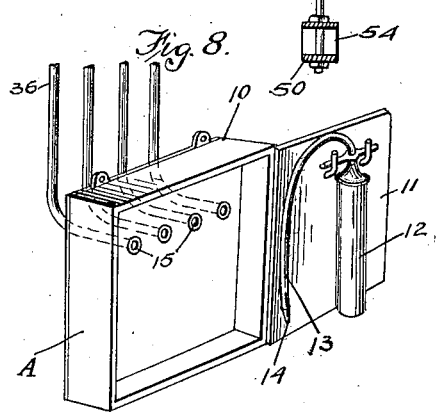
Fig. 8 is a perspective view of the selective operating station.

Referring to the drawings by characters of reference, (A) designates the common central operating station which consists of a box 10 provided with a hinged cover 11 upon which is removably mounted a pump 12 having the usual hose 13 and nozzle 14, the latter being adapted to engage with any one of the openings 15 with which the rear wall of the casing is provided. (B) designates generally the casings which receive the alarm devices or boxes (C) and as all of the alarm boxes and casings are identical in construction, a description of one will suffice for all. The casing (B) comprises a box-like structure 16, which is open at one side and which is adapted to be secured to the wall of the room or any other suitable object. The alarm box (C) comprises a block 17 and a housing 18 which are secured together by means of bolts 19. The housing is provided with a door 20 whereby access may be had to the interior of the housing. The block 17 is provided with a series of openings 21 in which are arranged the sleeve-like barrels 22 which provide breeches for the reception of the cartridges 23, the same being held in the barrels by the rear wall 24 of the housing when the latter is secured to the block. The alarm box is provided with trunnions 25 at its upper and lower extremities which are adapted to rotate in the bearings 26 with which the casing is provided, whereby the alarm boxes are pivotally associated with the casing. The trunnions 25 are provided with drums 27 around which are wound the cables 28, one extremity of which is connected to the drum, the remaining extremity is connected to a coil spring 29, the free end of which is secured to the casing at 30. By this arrangement it will be seen that the tension of the spring will normally tend to rotate the alarm boxes in order to project the muzzles of the barrels through the open side of the casing and in order to limit the rotation of said boxes to a one-half turn, a stop 31 is provided on each box which will contact with one edge of the casing. Arranged vertically within the casing is a cylinder 32, and slidable therein is a piston 33 which is provided with a piston rod 34, the latter extending through an opening in the lower cylinder head. The upper cylinder head is provided with an opening in which is arranged a pipe 35 and connecting the pipe 35 and one of the openings 15 is a tube 36. The rear wall 24 of the housing 18 is provided with a series of openings 37 which register with the barrels 22 and pivoted within the housing adjacent the openings is a series of hammers 38 provided with firing pins 39, the hammers preferably being pivoted by means of transverse shafts 40 having coil springs 41 wound thereon. The medial portion of each of the springs is bent to provide the U shaped members 42 which are extended through an opening in the hammers as shown and in order to prevent lateral movement of the hammers on the shaft, the sleeves 43 are provided thereon. Anti-friction rollers 44 are provided on the portions 42 of the spring at one side of the hammer for a purpose to be hereinafter specified. Vertically arranged near one side wall of the lower portion of the housing 18 is a locking bolt 45 which extends through an opening in the lower wall of the housing for engagement with an opening 46 in the casing (B) whereby the alarm boxes are normally locked against rotation under action of the coil springs 29. The upper extremity of the locking bolt 45 is received in the bearing 47 and is provided with a pair of spaced pins 48 between which one extremity of the pivoted trip arm 49 is received, the latter being pivoted to the casing as shown. The lower extremity of the piston rod 34 is provided with a yoke 50 which extends transversely of the housing and is connected with a vertically extending releasing rod 51, the latter passing through the guides 52 provided on the rear wall 24 of the housing. Anti-friction rollers are provided on said guides as shown to allow of the free movement of said rod and as shown, the releasing rod 53 normally engages with the anti-friction rollers 44 on the portion 42 of the springs 41 in order to retain the hammers 38 against movement under the action of the spring. The outer extremity 54 of the yoke normally engages with the remaining extremity of the trip arm 49 as shown in Fig. 7 of the drawings.

In operation of the device should the occupant of the house become alarmed by suspicious noises in the building, he will attach the nozzle 14 of the pump to one of the openings 15 after determining in which room the disturbance is occurring. Upon operation of the pump, air will be forced through the tubes 36 to the cylinder 32 thus moving the piston downwardly. A corresponding downward movement will be imparted to the yoke through the medium of the piston rod 34 and the extremity 54 of the yoke will contact with the trip arm 49, producing an upward movement of the locking bolt 45 and releasing the lower portion of the same from the opening 46 in the casing B. The springs 29 will then cause the alarm box (C) to rotate upon its pivots until the stop 31 contacts with the edge of the casing, thus disposing the muzzles 22 outwardly of the casing toward the interior of the room and as the piston continues to descend, the releasing rod 53 will disengage the upper spring 41 allowing the same to forcibly swing the hammer, bringing the firing pin into engagement with the cap of the upper cartridge. The continued downward movement will successively release the springs until all of the cartridges have been fired and should it be found that the intruder has escaped to another room, the operator may select the corresponding opening 15 and repeat the operation until the intruder has entirely fled from the premises, thus obviating the necessity of the occupant of the house having to face an armed burglar.

While we have shown and described a simple and preferred form of carrying our invention into practice, we do not care to be limited to the exact details of construction therein exhibited as the same are merely illustrative of one method of utilizing the system.

What is claimed as new is:

1. A protective system of the class described comprising a plurality of pivoted devices each having an alarm mechanism normally arranged in an inactive position and mechanical means for selectively swinging said devices to an active position and operating the alarm mechanisms.

2. A protective system of the class described comprising a plurality of pivoted devices having openings therein for receiving cartridges, means for firing the same successively, means for rotating said devices and means for locking and releasing the same.

3. A protective system of the class described comprising a plurality of pivoted alarm boxes having openings therein for receiving cartridges, means for firing the same, means for rotating said boxes and means for locking and releasing the same successively.

4. A protective system of the class described comprising a plurality of pivoted alarm boxes having openings therein for receiving cartridges, means for firing the same, means for rotating said boxes and selective means for locking and releasing the same successively.

5. A protective system of the class described comprising a plurality of casings open at one side, alarm boxes pivotally mounted therein, barrels arranged in said boxes for the reception of cartridges, means for swinging said boxes to dispose the muzzles of said barrels through the open side of said casings, locking means for normally retaining the boxes with the muzzles of the barrels disposed within said casing, means for releasing said locking means, and mechanism for successively firing said cartridges.

6. A protective system of the class described comprising a plurality of casings, alarm boxes pivotally mounted therein, barrels arranged in said boxes for the reception of cartridges, means for swinging said boxes to dispose the muzzles of said barrels externally of the casings, and means for firing said cartridges.

7. A protective system of the class described comprising a plurality of casings open at one side, alarm boxes pivotally mounted therein, barrels arranged in said boxes for the reception of cartridges, means for swinging said boxes to dispose the muzzles of said barrels through the open side of said casings, a plurality of spring-pressed hammers each mounted adjacent the rear end of a barrel, a rod engaging said hammers for holding them normally out of engagement with the cartridges, said rod being slidably mounted, and means for moving said rod whereby to release said hammers successively.

8. A protective system of the class described comprising a plurality of casings open at one side, alarm boxes pivotally mounted therein, barrels arranged in said boxes for the reception of cartridges, means for swinging said boxes to dispose the muzzles of said barrels through the open side of said casings, a plurality of spring-pressed hammers each mounted adjacent the rear end of a barrel, a rod engaging said hammers for holding them normally out of engagement with the cartridges, said rod being slidably mounted, and means for moving said rod whereby to release said hammers successively, said means including a cylinder, a piston movable therein and connected with said rod, and means for supplying air under pressure into said cylinder.

In testimony whereof we affix our signatures.

KUWAKICHI FUJITA.
GERTRUDE N. MARKLE.